US009577242B2

United States Patent
Coad (10) Patent No.: US 9,577,242 B2
(45) Date of Patent: Feb. 21, 2017

(54) INTERNAL HEADER FLOW DIVIDER FOR UNIFORM ELECTROLYTE DISTRIBUTION

(71) Applicant: ZBB Energy Corporation, Menomonee Falls, WI (US)

(72) Inventor: Nathan Coad, Bateman (AU)

(73) Assignee: EnSync, Inc., Menomonee Falls, WI (US)

( * ) Notice: Subject to any disclaimer, the term of this patent is extended or adjusted under 35 U.S.C. 154(b) by 401 days.

(21) Appl. No.: 14/182,398

(22) Filed: Feb. 18, 2014

(65) Prior Publication Data

US 2014/0162095 A1    Jun. 12, 2014

Related U.S. Application Data

(63) Continuation-in-part of application No. 13/591,802, filed on Aug. 22, 2012.
(Continued)

(51) Int. Cl.
*H01M 2/38* (2006.01)
*H01M 2/40* (2006.01)
(Continued)

(52) U.S. Cl.
CPC ............... *H01M 2/38* (2013.01); *H01M 2/40* (2013.01); *H01M 8/04283* (2013.01);
(Continued)

(58) Field of Classification Search
None
See application file for complete search history.

(56) References Cited

U.S. PATENT DOCUMENTS

| 4,691,158 A | 9/1987 | Hashimoto et al. |
| 5,591,538 A * | 1/1997 | Eidler ............. H01M 4/663 29/623.1 |

(Continued)

FOREIGN PATENT DOCUMENTS

| EP | 0015096 A1 | 9/1980 |
| JP | 2002219464 A | 8/2002 |
| WO | WO2008116248 | * 10/2008 |

OTHER PUBLICATIONS

International Search Report and the Written Opinion of the International Searching Authority, or the Declaration; International Application No. PCT/US2012/051860, mailed Jan. 21, 2013—(9 pages).

*Primary Examiner* — Ula C Ruddock
*Assistant Examiner* — Matthew Van Oudenaren
(74) *Attorney, Agent, or Firm* — Boyle Fredrickson, SC (57) ABSTRACT

The present disclosure details header flow divider designs and methods of electrolyte distribution. Internal header flow dividers may include multiple flow channels and may be built into flow frames. Flow channels within internal header flow dividers may divide evenly multiple times in order to form multiple flow channel paths and provide a uniform distribution of electrolytes throughout electrode sheets within electrochemical cells. Furthermore, uniform electrolyte distribution across electrode sheets may not only enhance battery performance, but also prevent zinc dendrites that may be formed in electrode sheets. The prevention of zinc dendrite growth in electrode sheets may increase operating lifetime of flow batteries. The disclosed internal header flow dividers may also be included within end caps of electrochemical cells.

19 Claims, 5 Drawing Sheets

Related U.S. Application Data

(60) Provisional application No. 61/526,146, filed on Aug. 22, 2011.

(51) Int. Cl.
*H01M 12/08* (2006.01)
*H01M 8/04* (2016.01)
H01M 10/36 (2010.01)
H01M 8/18 (2006.01)
H01M 10/42 (2006.01)

(52) U.S. Cl.
CPC .......... *H01M 12/085* (2013.01); *H01M 8/188* (2013.01); *H01M 10/365* (2013.01); *H01M 10/4214* (2013.01); *Y02E 60/50* (2013.01); *Y10T 137/2224* (2015.04)

(56) References Cited

U.S. PATENT DOCUMENTS

| | | | |
|---|---|---|---|
| 5,650,239 A | | 7/1997 | Lex et al. |
| 6,116,523 A | * | 9/2000 | Cabahug .............. A01G 25/023 138/42 |
| 6,524,452 B1 | | 2/2003 | Clark et al. |
| 6,905,797 B2 | | 6/2005 | Broman et al. |
| 7,939,190 B2 | | 5/2011 | Colello et al. |
| 8,137,831 B1 | | 3/2012 | la O' et al. |
| 2004/0080406 A1 | | 4/2004 | Huang |
| 2004/0170893 A1 | * | 9/2004 | Nakaishi ............. H01M 8/0273 429/185 |
| 2010/0119937 A1 | * | 5/2010 | Winter ................... H01M 2/40 429/185 |
| 2010/0227204 A1 | | 9/2010 | Zito |
| 2012/0058370 A1 | | 3/2012 | Kell et al. |
| 2012/0208061 A1 | | 8/2012 | Sahu et al. |

* cited by examiner

INTERNAL HEADER FLOW DIVIDER FOR UNIFORM ELECTROLYTE DISTRIBUTION

CROSS-REFERENCE TO RELATED APPLICATIONS

This application claims priority as a continuation-in-part of U.S. Non-Provisional Patent Application Ser. No. 13/591,802, filed on Aug. 22, 2012, which in turn claims priority from U.S. Provisional Patent Application Ser. No. 61/526,146, filed on Aug. 22, 2011, the entirety of which are each expressly incorporated by reference herein.

BACKGROUND

Field

The present disclosure relates generally to flowing electrolyte battery systems, and more particularly, to electrolyte distribution enhancement within high performance battery cells.

Background Information

Battery electrodes currently employed in flow batteries may have several performance and durability limitations. In zinc-bromine flowing electrolyte batteries, stacks share an aqueous zinc bromide electrolyte and each cell may have its own bi-polar electrode for deposit and dissolution of elemental zinc during charge and discharge cycles. In this type of battery, the electrolyte flow to a stack or specific cell(s) can be inhibited by poorly placed zinc deposits. Additionally, nucleation on electrodes can cause Zinc dendrite formation and branching between cells. As a result of the lowered zinc availability, the energy storage capacity of the neighboring stacks may be reduced. Another consequence is that the stack having the increased zinc accumulation may not fully deplete the zinc during discharge; eventually resulting in zinc accumulating on electrode sheets of the faulty stack to such an extent that may cause internal short circuiting between the cells of the stack which can potentially destroy the stack and possibly, the entire battery system. A further consequence is that the increased zinc accumulation can restrict the channels through which the electrolyte flows. As the electrolyte stream may act to cool the stack, the restricted flow may cause the stack to overheat and damage critical components. Therefore, zinc dendrites may reduce not only the performance of flow batteries but also the operating lifetime.

Additionally, flowing electrolyte batteries need a uniform electrolyte flow rate in each battery cell in order to supply chemicals evenly inside the battery cells. To achieve a uniform electrolyte flow rate through the cells, flowing electrolyte batteries define complex flow distribution zones. However, because electrolyte may have an oily, aqueous and gaseous multiphase nature, and because of structural constrain on the battery cells, uniform electrolyte flow rate is often not achieved.

For the foregoing reasons, there is a need for design and methods of flow channels which may provide good electrolyte distribution along the surface of electrode sheets, within electrochemical cells, in order to enhance flow battery conductivity and performance.

BACKGROUND ART

U.S. Pat. No. 6,905,797: Broman et al., Porous mat electrodes for electrochemical reactor having electrolyte solution distribution channels (Dec. 4, 2002)

Abstract: A multicell assembly for a redox flow electrolyzer is constituted by alternately stacking pre-assembled elements, typically an electrode subassembly including porous mat electrodes on opposite faces of a conductive plate and a permionic membrane subassembly. Pressure drops in circulating the electrolyte solutions through respective cell compartments, in contact with fluid permeable three-dimensional electrodes in the form of porous mats, are reduced while enhancing evenness of electrolyte refreshing over the whole geometrical cell-area, by defining cooperatively interleaved flow channels in the porous mat electrode. Two interleaved orders of parallel flow channels are defined. All the parallel spaced channels of each order extend from a common orthogonal base channel formed along the respective inlet or, outlet side of the electrolyte flow chamber, and terminate short of reaching the base channel of the other. The flow channels include comb-shaped flow distributing channelworks having parallel fingers which interleave with each other.

US20120058370: Kell et al., Flow Battery With Radial Electrolyte Distribution (Sep. 8, 2010)

Abstract: An electrochemical flow cell includes a permeable electrode, an impermeable electrode located adjacent to and spaced apart from the permeable electrode and a reaction zone electrolyte flow channel located between a first side of the permeable electrode and a first side of the impermeable electrode. The electrochemical flow cell also includes at least one electrolyte flow channel located adjacent to a second side of the permeable electrode, at least one central electrolyte flow conduit extending through a central portion of the permeable electrode and through a central portion of the impermeable electrode and at least one peripheral electrolyte flow inlet/outlet located in a peripheral portion of the electrochemical cell above or below the permeable electrode.

U.S. Pat. No. 8,137,831: Ia et al., Electrolyte flow configuration for a metal-halogen flow battery (Jun. 27, 2011)

Abstract: A flow battery and method of operating a flow battery. The flow battery includes a first electrode, a second electrode and a reaction zone located between the first electrode and the second electrode. The flow battery is configured with a first electrolyte flow configuration in charge mode and a second flow configuration in discharge mode. The first electrolyte flow configuration is at least partially different from the second electrolyte flow configuration.

US20120208061: Sahu et al., FLOW CELL STACK (Jan. 13, 2012)

Abstract: A stacked cell for a flow cell battery is presented. The stacked cell is sealed by a gasket between individual components. The gasket is formed such that it seals against leakage of electrolytes and facilitates the flow of electrolytes through the stacked cell. Further, the gasket is formed to minimize the linear expansion of the gasket material with temperature.

U.S. Pat. No. 6,524,452: Clark et al., Electrochemical cell (Jun. 22, 2001)

Abstract: A flow-frame for forming a subassembly; said sub-assembly comprising a bipolar electrode and an ion-selective membrane mounted on said flow-frame and wherein said sub-assembly may be stacked together with other such subassemblies to create an array of electrochemical cells; wherein said flow-frame is formed from an electrically insulating material and comprises at least four manifold-defining portions which also define pathways for the passage of the anolyte/catholyte. Such pathway may define a labyrinthine path which may be spiral in shape between the manifold and the chamber entry/exit port.

SUMMARY

The present disclosure details header flow divider designs and methods of electrolyte distribution. Internal header flow dividers may be built into flow frames and may include multiple flow channels. Internal header flow dividers may divide flow channels evenly multiple times, forming multiple flow channels and providing a uniform distribution of electrolytes throughout electrodes within electrochemical cells. Even distribution of the electrolyte stream may ensure uniform current flow across electrodes and may allow the production of high current flow batteries.

Furthermore, even electrolyte distribution may prevent zinc dendrites that may be formed on electrode sheets. The prevention of zinc dendrite growth in electrode sheets may increase performance and operating lifetime of flow batteries.

According to the present disclosure, internal header flow dividers built in flow frames, may include electrolyte flow splitting designs that may exhibit multiple order splits such as first, second, third and fourth order splits in flow channels. The disclosed design of flow channels within internal header flow dividers, may result in multiple flow channels in which each flow channel may have the same flow resistance because each of flow channels would generally have the same length and the same number or radius of bends.

The disclosed internal header flow dividers may also be built in end caps or terminal electrodes of electrochemical cell stacks.

LIST OF FIGURES

Embodiments of the present disclosure are described by way of example with reference to the accompanying figures, which are schematic and are not intended to be drawn to scale.

DETAILED DESCRIPTION

The present disclosure is hereby described in detail with reference to embodiments illustrated in the drawings, which form a part hereof. In the drawings, which are not necessarily to scale or to proportion, similar symbols typically identify similar components, unless context dictates otherwise. Other embodiments may be used and/or and other changes may be made without departing from the spirit or scope of the present disclosure. The illustrative embodiments described in the detailed description are not meant to be limiting of the subject matter presented herein.

Definitions

As used herein, "battery cell" may refer to an enclosure provided with at least a pair of electrodes and at least one inlet and one outlet configured to allow the flow of electrolyte through the enclosure.

As used herein, "flow battery" or "flowing electrolyte battery" may refer to an electrochemical device that includes at least one battery cell stack and is capable of storing energy.

As used herein, "battery cell stack" may refer to one or more battery cells, placed between a pair of terminal electrodes or end caps that share a common electrolyte path.

As used herein, "flow frame" may refer to at least one plenum that may house at least one electrode sheet or at least one micro-porous separator membranes within electrochemical cells, and that may include at least a portion of paths configured to control the flow of electrolyte through a battery cell stack.

As used herein, "end caps" may refer to at least a pair of terminal plates which may house electrode sheets; include fluid inlets and outlets, electrical connections to the stack, at least a portion of paths configured to control the flow of electrolyte through a battery cell stack and are generally placed at each end of a cell stack.

As used herein, "electrode" may refer to at least one polymeric material that has the ability of transferring electrical charge and thus exhibits electrical conductivity.

As used herein, "anolyte" may refer to the portion of the electrolyte in proximity to the anode electrode in the battery.

As used herein, "catholyte" may refer to the portion of the electrolyte in proximity to the cathode electrode in the battery.

DESCRIPTION OF DRAWINGS

Disclosed here are methods for enhancing electrolyte flowing mechanism within a battery cell by employing a plurality of flow channels within internal header flow dividers that may be built in flow frames and end caps. The inclusion of the disclosed internal header flow dividers in flow frames and end caps within electrochemical cells may improve performance of flow battery systems. Embodiments in this disclosure may be applicable to flow batteries such as: ZnBr, ZnCl, ZnHBr, ZnFe, CeZn, among others.

Figure 1:
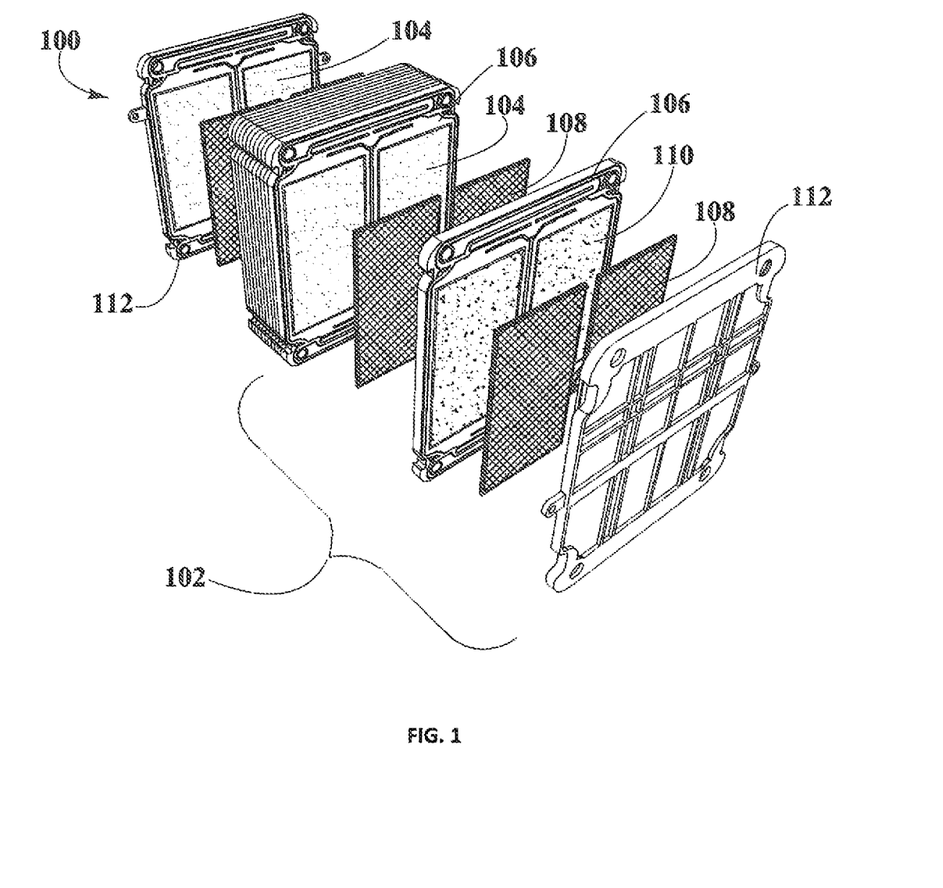
FIG. 1 depicts a flow battery cell stack, according to an embodiment.

FIG. 1 depicts an embodiment of a flow battery cell stack 100 that may include a number of battery cells 102. Flow battery cell stack 100 may include electrode sheets 104, which may be bonded to flow frames 106, half-cell spacer screens 108 and micro-porous separators 110, which may also be bonded to flow frames 106. Flow battery cell stack 100 may be formed of a number of flow frames 106 disposed between a pair of end caps 112, each having fluid inlets and outlets therein. End caps 112 would generally house the terminal electrode 104 sheets.

Figure 2:
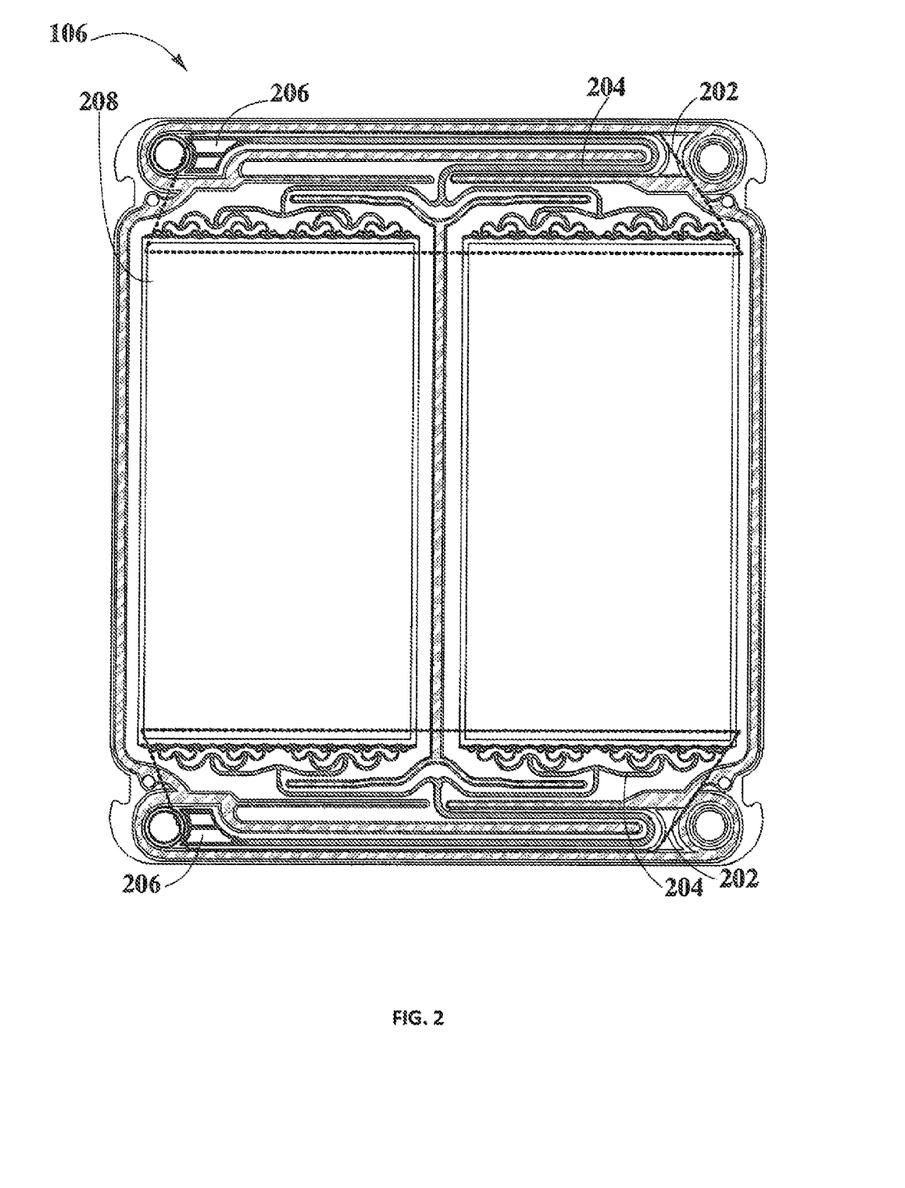
FIG. 2 illustrates a flow frame, according to an embodiment.

As shown in FIG. 2, internal header flow divider 202 delineated by the dotted line is built in flow frames 106 may be designed such that flow channels 204 form in the divider 202 may divide evenly multiple times in order to form a plurality of fluid paths or flow channels 204 for electrolyte distribution.

According to one embodiment, electrolyte access 206 (e.g., inlets and outlets) may be included within internal header flow dividers 202 in order to allow flow of electrolyte from anolyte flow system and catholyte flow system (not shown) into and from electrode sheets 104 through passages such as flow channels 204. Furthermore, plurality of flow channels 204 within flow frames 106 may allow an even electrolyte distribution along surface of electrode sheets 104 within battery cells 102. Even distribution of electrolyte stream may ensure uniform current flow across electrodes 104 and may allow the production of highly conductive flow battery cell stacks 100. Uniform electrolyte distribution may also prevent zinc dendrites that may be formed in electrode sheets 104. Prevention of zinc dendrite growth in electrode sheets 104 may not only enhance flow battery performance but also increase operating lifetime of flow batteries.

Additionally, plurality of flow channels 204 within internal header flow divider 202 may cause some turbulence on the electrolyte flow which may induce mixing of electrolyte phases enhancing the even phasic distribution within the multiple bifurcations and micro-fine chemical dispersions within the flow battery cells 102 for increased chemical transport between the phases, resulting in increased stack current capacity. In some embodiments, structures for calming and diffusing the electrolyte turbulent flow may be included in the electrolyte fluid circuit immediately after battery cell 102 pathways. The high mixing flow may be useful during both charging and discharging processes.

According to an embodiment, flow frames 106 may have a rectangular shape or any other suitable shape in order to facilitate insertion of electrodes 104 and micro-porous separators 110 into battery cells 102. Additionally, flow frames 106 may include at least one rectangular space 208, in which at least one electrode sheet 104 or at least one micro-porous separator sheet 110 may be housed. The present disclosure may include a flow frame 106 design that includes at least two rectangular spaces 208.

Figure 3:
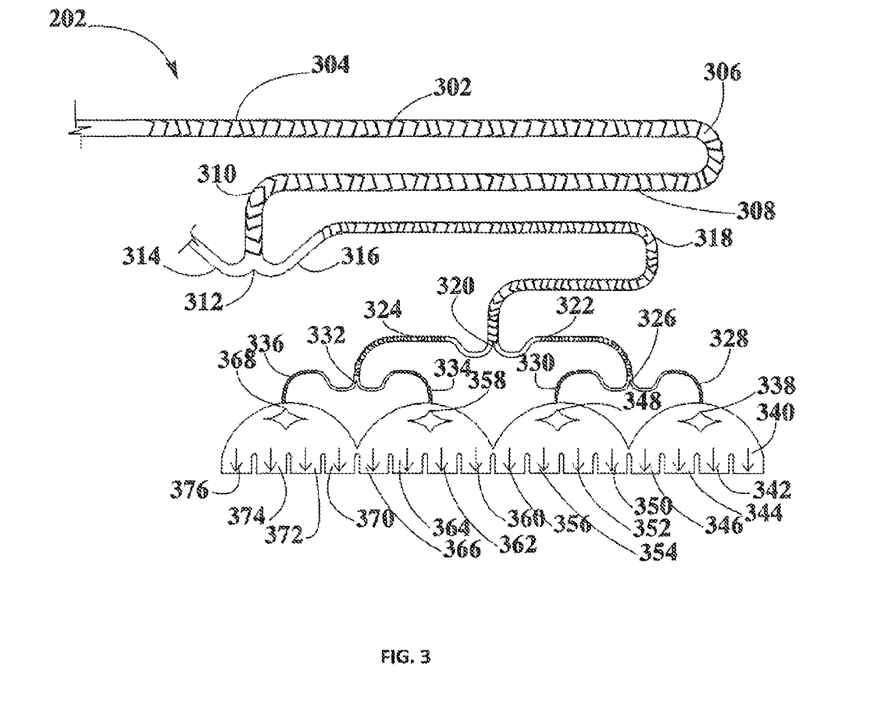
FIG. 3 illustrates half portion of internal header flow divider, according to an embodiment.

As shown in FIG. 3, internal header flow dividers 202 may include a design that may exhibit a plurality of flow channels 204. Electrolyte flowing within flow channels 204 may be anolyte, catholyte or a mixture of both. According to one embodiment, electrolyte flowing through flow channels 204 may exhibit a flow rate from about 50 ml/min to about 200 ml/min, preferred being 100 ml/min. Reynolds number (Re) of electrolyte running within flow channels 204 may be in the range of about 250 to about 1000, such that laminar or transitional flow of the electrolyte in the channels 204 is generally achieved.

According to one embodiment, suitable hydraulic diameter of flow channels 204 may be of about 1.65 mm. Additionally, flow channels 204 may exhibit round tubular configurations or square tubular configurations, or any other suitable tubular configuration. Furthermore, flow channels 204 or a portion of flow channels 204 may exhibit a hydraulically smooth surface or increased hydraulic diameter to allow electrolyte to flow freely. Moreover, flow channels 204 or a portion of flow channels 204 may also include mixing chevrons 302 features or other surface features that may be built inside the flow channels 204 cavity. Mixing chevrons 302 built into flow channels 204 may enhance mixing of multi-phase electrolyte into a continuous emulsion, even at low flow rates. Mixing chevrons 302 may exhibit different shapes such as: airfoil, semicircular and saw-tooth, among others. Mixing chevrons 302 may also exhibit different surface textures such as roughened via abrasion or repeated micro-structure, for example a cubic, conical or other patterned protrusion.

The present disclosure details a design of internal header flow divider 202, in which, electrolyte access 206 ay be connected to a single straight first long flow channel 304 which may successively divide into first level subflows or sub-channels that may split the electrolyte flow into at least two streams. Straight first long flow channel 304 may be of about 25 cm long. In order for first long flow channel 304 to lead electrolyte to middle top region of internal header flow divider 202, first long flow channel 304 may make a U-turn 306 of about 180 degrees, which may lead to a second long flow channel 308 that may run for about 12 cm long.

Subsequently, second long flow channel 308 may bend downward at turn 310 of about 90 (ninety) degrees, ending at first level bifurcation 312, which may split electrolyte flow into first level sub-channel 314 and first level sub-channel 316. Furthermore, both first level sub-channel 314 and first level sub-channel 316 may run for about 9 cm long. First level sub-channel 314 is formed similarly to first level sub-channel 316, as discussed below, and may make a turn (not shown) within 90° and may split again into at least two other sub-channels (not shown) and continue splitting in order to form second half (not shown) of internal header flow divide 202 within flow frame 106.

Similarly, in order to form first half of internal header flow divider 202 within flow frame 106, first level sub-channel 316 may make a U-turn C 318 of about 180°. Then first level sub-channel 316 further splits at second level bifurcation 320. Second level bifurcation 320 may divide electrolyte flow into second level sub-channel 322 and second level sub-channel 324. Second level sub-channel 322 may turn downward and may further split at third level bifurcation 326 into third level sub-channel 328 and third level sub-channel 330. Similarly, second level sub-channel 324 may bend downward and divide at third level bifurcation 332 into third level sub-channel 334 and third level sub-channel 336. Following the same process, third level sub-channel 328 may be split at fourth level bifurcation 338 and be divided into flow path 340 and flow path 342 as well as into flow path 344 and flow path 346. Additionally, third level sub-channel 330 may be split at fourth level bifurcation 348 and may form flow path 350, flow path 352, flow path 354 and flow path 356. Furthermore, third level sub-channel 334 may be split at fourth level bifurcation 358 and form flow path 360, flow path 362, flow path 364 and flow path 366. In order to form last section of electrolyte flow paths, third level sub-channel 336 may be split at fourth level bifurcation 368 and form flow path 370, flow path 372, flow path 374 and flow path 376.

As result of all levels of splitting, electrolyte flow may enter and contact an electrode sheet 104 through sixteen separate flow paths. As shown in FIG. 3, at least one stream of electrolyte may flow into electrode sheets 104 through each of the following flow paths: flow path 340, flow path 342, flow path 344, flow path 346, flow path 350, flow path 352, flow path 354, flow path 356, flow path 360, flow path 362, flow path 364, flow path 366, flow path 370, flow path 372, flow path 374, and flow path 376. Multiple electrolyte flow paths into each electrode sheet 104 may provide consistent flow distribution, a more even and laminar electrolyte flow to each electrode sheet 104 and effective spreading of electrolyte across electrode sheets 104 which may avoid stagnant regions on the sides of electrode sheets 104. Flow paths getting into electrodes 104 may have the same flow resistance because flow paths generally have the same length and the same number of turns, which have the same radius and the same geometry.

The disclosed design of internal header flow divider 202 may be first half of internal header flow divider 202; moreover, same design of internal header flow divider 202 may generally be included on second half of flow frame 106 in order to distribute electrolyte across both electrode sheets 104 that may be bonded to flow frame 106. In other embodiments, only one internal header flow divider 202 may be built in flow frame 106 which may house only one electrode sheet 104; or more than two internal header flow dividers 202 may be built in flow frames 106 which may house more than two electrode sheets 104.

In one embodiment, internal header flow divider 202 may be included at both top and bottom regions of flow frame 106, over and below electrode sheets 104.

Internal header flow divider 202 may allow equal division of flow volume, uniformity of viscosity, or uniformity of density of electrolyte. Additionally, design of internal header flow divider 202 may provide consistent electrolyte flow distribution under a wide range of fluid parameters. Internal header flow divider 202 may help electrolyte to achieve consistent horizontal flow rates and sufficient turbidity at each bifurcation to evenly distribute single or multi-phasic electrolytes across electrode sheets 104.

Internal header flow divider 202 may be fabricated using materials that may generally show a suitable resistance to reactants such as bromine. Suitable materials for the manufacture of internal header flow dividers 202 may be one or more polymers selected from polyethylene, polypropylene and copolymer blends of ethylene and propylene, acetal, nylons, polystyrene, polyethylene terephthalate, polyvinylidene fluoride, polyvinyl chloride, polytetrafluoroethylene, fluorinated ethylene-propylene copolymer, polyfluoramide or chlorinated polyoxymethylene, among others. Internal header flow dividers 202 may be manufactured employing molding processes.

In one embodiment, internal header flow divider 202 may also be included at top and bottom of each end cap 112 within a flow battery cell stack 100 assembly.

Figure 4:
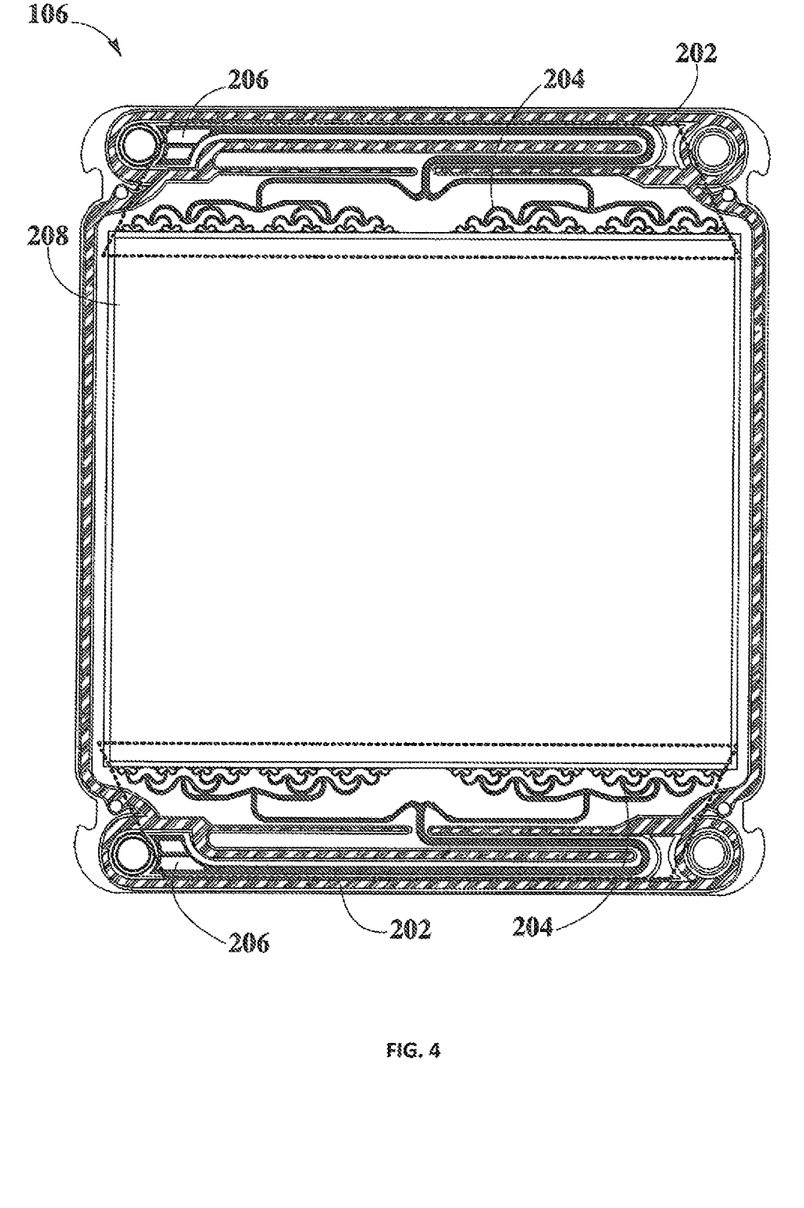
FIG. 4 illustrates internal header flow dividers that may include one rectangular electrode sheet, according to an embodiment.

FIG. 4 illustrates internal header flow dividers 202 that may be built at top and bottom regions of flow frame 106 which may include one rectangular electrode sheet 104, according to an embodiment.

Figure 5:
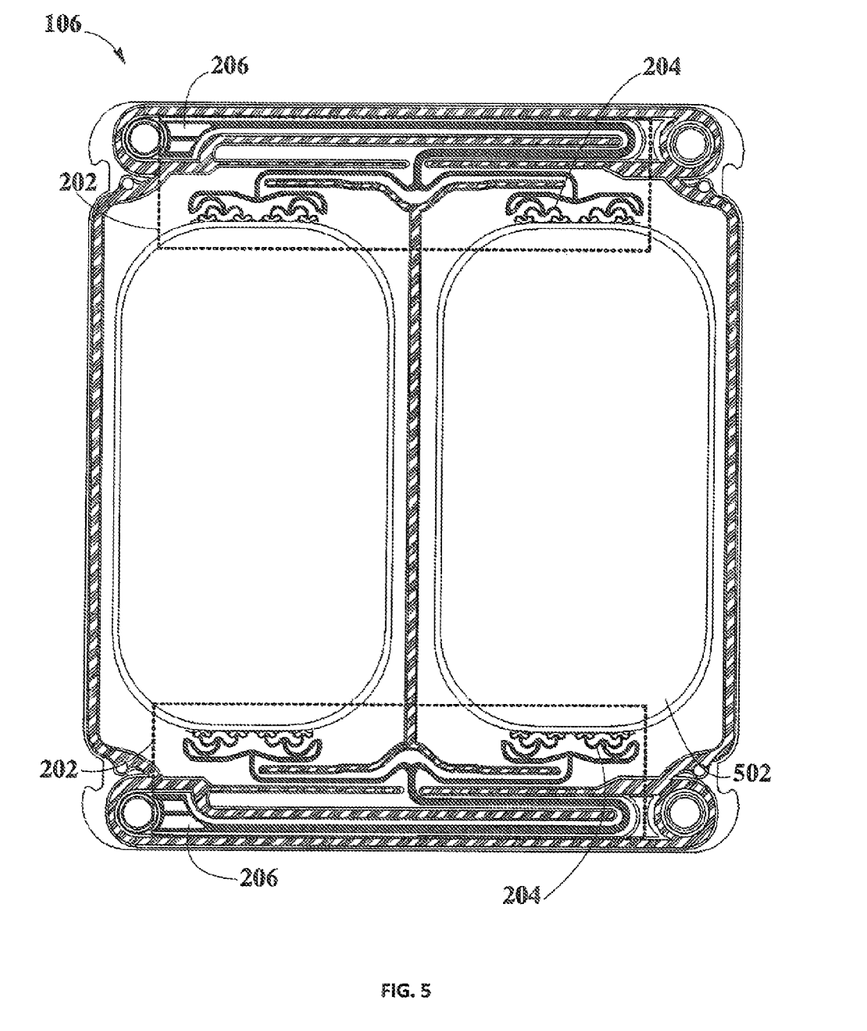
FIG. 5 illustrates internal header flow dividers that may include at least two oval electrode sheets, according to an embodiment.

FIG. 5 illustrates internal header flow dividers 202 that may be built at top and bottom regions and on both sides of flow frame 106 which may include at least two oval electrode sheets 104, according to an embodiment.

EXAMPLES

Example #1: is one embodiment of internal header flow divider 202, where, as shown in FIG. 4, internal header flow divider 202 may be built at top and bottom regions of flow frame 106 which may include one single rectangular electrode sheet 104. Flow channels 204 within internal header flow divider 202 may distribute electrolytes across the surface of electrode sheet 104.

Example #2: is one embodiment of internal header flow dividers 202, where, as shown in FIG. 5, at least two internal header flow dividers 202 may be built at top and bottom regions and on both sides of flow frame 106 which may include at least two oval electrode 104 sheets in oval spaces 502 within flow frames 106. Flow channels 204 within internal header flow divider 202 may distribute electrolytes across the surface of electrode sheets 104.

While various aspects and embodiments have been disclosed herein, other aspects and embodiments may be contemplated. The various aspects and embodiments disclosed herein are for purposes of illustration and are not intended to be limiting, with the true scope and spirit being indicated by the following claims.

I claim:

1. A flow divider for defining a number of fluid paths in a flow frame of an electrolyte battery flow cell; the flow divider comprising:
   a long flow channel operably connected to an electrolyte inlet;
   at least one pair of first level sub-channels operably connected to the at least one long flow channel at a first bifurcation wherein a diameter of the first level sub-channel is less than a diameter of the long flow channel;
   at least one pair of second level sub-channels operably connected to one of the at least one pair of first level sub-channels at a second bifurcation wherein a diameter of the second level sub-channel is less than a diameter of the first level sub-channel; and
   at least one pair of third level sub-channels operably connected to one of the at least one pair of second level sub-channels at a third bifurcation, wherein a diameter of the third level sub-channel is less than a diameter of the second level sub-channel.

2. The flow divider of claim 1 wherein each of the fluid paths defined by the flow divider between the electrolyte inlet and an outlet from each of the third level sub-channels has the same length to impart the same flow resistance across each fluid path in the flow divider.

3. The flow divider of claim 1 wherein each of the fluid paths defined by the flow divider between the electrolyte inlet and an outlet from each of the third level sub-channels has the same number of turns to impart the same flow resistance across each fluid path in the flow divider.

4. The flow divider of claim 1 wherein each of the fluid paths defined by the flow divider between the electrolyte inlet and an outlet from each of the third level sub-channels has the same internal geometry to impart the same flow resistance across each fluid path in the flow divider.

5. The flow divider of claim 1 further comprising at least one pair of fourth level sub-channels operably connected to one of the at least one, pair of third level sub-channels at a fourth bifurcation wherein a diameter of the fourth level sub-channel is less than a diameter of the third level sub-channel.

6. The flow divider of claim 5 further comprising at least one pair of fifth level sub-channels operably connected to one of the at least one pair of fourth level sub-channels at a fifth bifurcation wherein a diameter of the fifth level sub-channel is less than a diameter of the fourth level sub-channel.

7. The flow divider of claim 1 further comprising at least one additional bifurcation disposed in the flow divider prior to plurality of outlets of the flow divider and wherein the at least one additional bifurcation separates fluid exiting each of the third level sub-channels into more than two exit flow paths, wherein each exit flow path corresponds to one the plurality of outlets of the flow divider.

8. The flow divider of claim 7 wherein each of the additional bifurcations comprise:
   a) a curved wall operably connected to an outlet of the third level sub-channel; and
   b) a structure spaced adjacent the curved wall in a path of the fluid entering the additional bifurcation from the outlet of the third level sub-channel.

9. The flow divider of claim 8 wherein the structure includes a plurality of curved surfaces to direct the fluid entering each of the additional bifurcations into one of the exit flow paths.

10. The flow divider of claim 8 wherein each of the additional bifurcations further includes a number of inwardly extending partitions spaced from the structure opposite the third level sub-channel.

11. The flow divider of claim 1 further comprising a number of chevrons disposed along the fluid paths.

12. A flow frame for an electrolyte battery flow cell, the flow frame comprising:

a) a body including an electrolyte fluid inlet and an electrolyte fluid outlet;
b) at least one electrode sheet secured to the body; and
c) first flow divider formed according to claim 1 operably connected between the electrolyte fluid inlet and the electrode sheet.

13. The flow frame of claim 12 further comprising a second flow divider formed according to claim 1 operably connected between the electrode sheet and the electrolyte fluid outlet.

14. The flow frame of claim 12 further comprising a pair of electrode sheets, wherein each of the at least one pair of first level sub-channels of the first flow divider is operably connected to one of the electrode sheets.

15. The flow frame of claim 14 further comprising a second flow divider formed according to claim 1 wherein each of the at least one pair of first level sub-channels of the second flow divider is operably connected between the electrode sheets and the electrolyte fluid outlet.

16. A battery cell stack for an electrolyte flow battery comprising a number of the flow frames of claim 12.

17. A flow divider for defining a number of fluid paths in a flow frame of an electrolyte battery flow cell; the flow divider comprising:
a long flow channel integrally formed in the flow frame and operatively connected to an electrolyte inlet in the flow frame to receive electrolyte within the long flow channel;
at least one pair of first level sub-channels integrally formed in the flow frame and each pair of first level sub-channels is operatively connected to the at least one long flow channel at a first bifurcation wherein a diameter of each of the first level sub-channels is less than a diameter of the long flow channel;
at least one pair of additional level sub-channels integrally formed in the flow frame, each additional level sub-channel having an input and an output, wherein the input to each additional level sub-channel is joined in succession to the output of another level sub-channel at an additional bifurcation and wherein a diameter of each additional level sub-channel is less than the diameter of the preceding additional level sub-channel;
a plurality of final bifurcations integrally formed in the flow frame and each of the final bifurcations operatively connected to the output of one of the additional level sub-channel connected last in the succession of sub-channels, wherein the final bifurcation divides the electrolyte into more than two exit flow paths; and
a plurality of outlets, wherein each outlet corresponds to one of the exit flow paths from one of the plurality of final bifurcations.

18. The flow divider of claim 17 wherein each of the additional bifurcations comprise:
a curved wall integrally formed in the flow frame and operatively connected to the output of the corresponding additional level sub-channel connected last in the succession of sub-channels; and
a structure adjacent the curved wall and spaced apart from the output of the corresponding additional level sub-channel, wherein the structure is in a path of the electrolyte exiting the output of the corresponding additional level sub-channel.

19. The flow divider of claim 18 wherein each of the plurality of outlets is defined by a first partition and a second partition, wherein the first and second partitions are generally parallel to each other and spaced apart from the structure opposite the ouput of the corresponding additional level sub-channel.

* * * * *